2,881,199

PROCESS FOR PRODUCING ALKOXYSILICON COMPOUNDS

Donald L. Bailey, Snyder, and Francis M. O'Connor, Kenmore, N.Y., assignors to Union Carbide Corporation, a corporation of New York No Drawing. Application November 14, 1956 Serial No. 622,000

12 Claims. (Cl. 260—448.8)

This invention relates to a process for producing silicon-containing organic compounds. More particularly this invention is directed to a process for producing alkoxysilicon compounds from alkylsiloxanes and alcohols. The alkoxysilicon compounds produced in our process may be represented by the graphical formula:

$$X[RXSiO]_nSiX_2R \qquad (1)$$

wherein $n$ is an integer from 0 to 2, X is an alkyl group, a methoxy group, an alkoxymethoxy group, an ethoxy group or an alkoxyethoxy group, at least one group represented by X is a group other than an alkyl group and R is an alkyl group.

Alkoxysilicon compounds that may be represented by graphical Formula 1 are useful starting materials in many known processes. By way of illustration, the ethoxy groups present in the dialkyldiethoxysilane products of our process can be hydrolyzed, the hydrolyzate so produced can be dehydrated and the dehydrated hydrolyzate can be polymerized, such as by known equilibration techniques, to produce dialkylpolysiloxanes. These dialkylpolysiloxanes are useful in producing viscous oils and gums that can be converted to silicone elastomers.

It is known that monomeric alkoxysilane compounds can be produced by reacting alcohols and chlorosilanes. The same or similar reactions are not well suited, as far as it is known, for the production of polymeric alkoxysiloxanes. One reason for this is the difficulty in producing the necessary chlorosiloxane starting materials. This difficulty arises because, during the conventional hydrolysis and dehydration reactions used to form the silicon to oxygen to silicon bonds present in siloxanes, any silicon to chlorine bonds tend to be replaced by silicon to oxygen bonds.

Other processes for producing alkoxysilicon compounds are known. By one such process alcohols can be reacted with diorganopolysiloxanes and by another known process diorganodialkoxysilanes can be reacted with water to produce, by both processes, alkoxysilicon compounds. However, both of the latter processes are limited to the production of mixtures of alkoxysiloxane compounds of high molecular weight and are further limited to low yields of any desired compound since the amount of each compound produced is found to be governed by the laws of probability.

None of the above-mentioned known processes provides for the production of low molecular weight monofunctional and/or trifunctional alkoxysilicon compounds from alkylsiloxanes containing combined monofunctional and/or combined trifunctional groups; nor do any of the known processes provide for the production of alkoxysilicon compounds from siloxane materials such as scrap silicone elastomers so that the siloxane components combined therein can be recovered in a useful form.

Still another process for producing alkoxysilicon compounds is known and it comprises forming a mixture of an alkylpolysiloxane, an alcohol that has a boiling point higher than isopropanol and a catalytic amount of an alkali metal hydroxide, heating the mixture to a temperature sufficiently elevated to cause the alcohol and the siloxane to react to produce alkoxysilicon compounds and water and continually removing the water so formed. Only alcohols that have boiling points higher than isopropanol were found to be useful in the latter process and alkali metal hydroxide catalysts were required.

We have found that alkoxysilicon compounds that may be represented by graphical Formula 1 can be produced by forming a mixture of an alkylsiloxane, an acidic catalyst and an alcohol, heating the mixture to a temperature sufficiently elevated to cause the siloxane and the alcohol to react to produce said alkoxysilicon compounds and water and continuously removing the water formed in the reaction from the mixture.

The alkylsiloxanes used as reactants in our process are compounds that may be represented by the graphical formula:

$$(R_3SiO_{0.5})_q(R_2SiO)_r(RSiO_{1.57})_s \qquad (2)$$

wherein R is an alkyl group such as a methyl, ethyl or propyl group and $q$, $r$ and $s$ are either zero or integers and have a sum of at least 2. Illustrative of alkylsiloxanes that are suitable for use as reactants in our process are such linear compounds as hexamethyldisiloxane, octamethyltrisiloxane and the like; such cyclic compounds as hexamethylcyclotrisiloxane, octamethylcyclotetrasiloxane and the like; such cross-linked materials as the condensed cohydrolyzates produced when mixtures of methyltrichlorosilane, dimethyldichlorosilane and trimethylchlorosilane are cohydrolyzed and condensed and such polymeric materials as dimethylpolysiloxane oils and gums. The alkylsiloxane reactants may have molecular weights of from 162 (e.g. when hexamethyldisiloxane is used as a reactant) up to 1,000,000 and above (e.g. when a dimethylpolysiloxane gum is used as a reactant).

The instant process provides for the use of alkylsiloxanes that may be represented by graphical Formula 2 whether their structure is linear, cyclic or crosslinked. The alkylsiloxane reactants of our process may contain small amounts of such constituents as, for example, carbon to carbon chains linking the molecules of the alkylsiloxane, halogen atoms bonded to silicon atoms, alkenyl groups bonded to silicon atoms and the like. Carbon to carbon chains linking the molecules of an alkylsiloxane are often present in alkylsiloxanes that have been mixed with fillers and converted to silicone elastomers. Regardless of chemical modifications such as carbon to carbon crosslinking between the molecules or physical modifications, such as the incorporation of a filler, alkylsiloxanes that conform essentially to graphical Formula 2 are useful reactants in our process.

The alkylsiloxanes that can be used as reactants in our process are produced by known methods. By one known method a dialkyldichlorosilane is hydrolyzed to produce a hydrolyzate. A dialkylpolysiloxane gum is produced from the hydrolyzate by heating a mixture of the hydrolyzate and a basic catalyst. The gum so produced is useful as a reactant in our process.

The alcohols used as reactants in our process may be represented by the graphical formula:

$$Y(CH_2)_mOH$$

wherein Y is a hydrogen atom or an alkoxy group and $m$ is an integer from 1 to 2. Illustrative of the alcohol reactants that are useful in our process are methanol, the alkoxymethanols such as methoxymethanol, ethanol and the alkoxyethanols such as 2-methoxyethanol.

The alcohol reactant used in our process may be present in an amount equal to from about 0.5 to about 10.0 gram-moles per gram-atom of combined silicon in the alkylsiloxane reactant, but we prefer that the alcohol be present in an amount equal to from about 2 to about 5 gram-moles per gram-atom of combined silicon in the alkylsiloxane reactant. The relative amounts of the alcohol and of combined silicon in the alkylsiloxane present in the reactor are not narrowly critical and so relative amounts other than the indicated ratios may be used. However, no commensurate advantage is gained by operating our process using other than the indicated ratios of reactants.

In view of the reactants used and the products obtained it appears that the reaction that takes place between our reactants can be illustrated by the following equation:

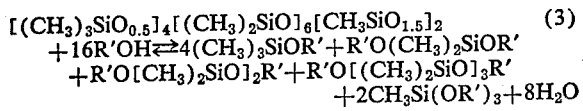

wherein R' is a methyl, an alkoxymethyl, an ethyl or an alkoxyethyl group.

The major part of the alkoxysilicon products formed in accordance with our process is usually of the type shown in Equation 3. That is, the silicon atoms that are trifunctional in the alkylsiloxane reactant are usually converted to monosilicon-containing trialkoxysilanes. Similarly, silicon atoms that are monofunctional in the alkylsiloxane reactant are usually converted to monosilicon-containing monoalkoxysilanes. On the other hand, the silicon atoms that are difunctional in the alkylsiloxane reactant are usually converted to disilicon-containing or trisilicon-containing dialkoxysiloxanes or to monosilicon-containing dialkoxysilanes. Illustrative of the alkoxysilicon products that are usually produced in large amounts by our process are the bis(dialkylethoxysiloxy)-dialkylsilanes, the dialkylethoxysiloxydialkylethoxysilanes, the alkyltriethoxysilanes, the dialkyldialkoxysilanes and the trialkylethoxysilanes.

Only small amounts of alkoxysiloxanes containing monofunctional or trifunctional silicon atoms and more than one silicon atom per molecule are normally produced along with the type of products illustrated by Equation 3. Similarly only small amounts of dialkoxysiloxanes containing more than three difunctional silicon atoms per molecule are usually produced in our process. Illustrative of the alkoxysilicon products usually produced in small amounts by our process are the bis(trialkylsiloxy)alkylethoxysilanes, the trialkylsiloxyalkyldiethoxysilanes and the (bis(ethoxy)octaalkyltetrasiloxanes.

It was found that to produce the desired products of our process (i.e. those that may be represented by graphical Formula 1), it was necessary to continuously remove the water that was formed during our process. If the water was not removed continuously essentially only high molecular weight alkoxysilicon products were obtained. It appears that the reaction between our reactants, as illustrated by overall Equation 3, is one that proceeds by a series of steps. In each step a silicon to oxygen to silicon bond is broken. Equations 4a and 4b represent such a stepwise reaction wherein an endblocked alkylsiloxane comprising combined difunctional dialkylsiloxane groups reacts with an alcohol.

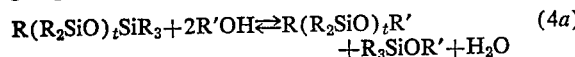
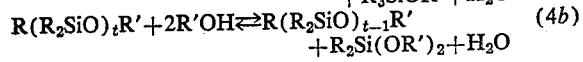

wherein R and R' have the same significance as above and $t$ is an integer greater than 1. The removal of the water formed in our process seems to favor the equilibrium that appears to exist among the reactants and products shown in Equations 4a and 4b in such a manner as to produce larger amounts of products having fewer silicon atoms per molecule than the reactants.

The water that is formed during our process can be continuously removed from the reaction mixture by any one of several known means. By way of illustration, the reaction mixture may be heated to the boiling point of the water and the water distilled from the reaction mixture but this means of removing the water usually requires a higher temperature operation of our process than the hereinafter-mentioned preferred means. We prefer to remove the water by adding to the reactants a liquid organic compound which forms an azeotrope with water or with water and the alcohol reactant, and heating the reaction mixture to a temperature sufficiently elevated to cause the desired reaction to occur and to vaporize the azeotrope.

Alternately, a hydrophylic absorbent may be placed in the reaction mixture at the start of our process to remove continuously the water formed in the reaction.

The azeotrope that may be vaporized as a means to remove the water formed in our process may contain two components (i.e. the water and the liquid organic compound) or it may contain three components (i.e. the water, the liquid organic compound and the alcohol reactant). In either case, we prefer to condense the vaporized azeotrope and to separate the water from the condensed azeotrope after it has been withdrawn from the reaction mixture. The anhydrous portion of the condensate can then be returned to the reaction mixture. Any suitable means can be used to remove the water from the condensed azeotrope. By way of illustration, when the azeotrope forms a condensate that separates into a water-rich phase (i.e. a phase containing more than half of the water present in the condensate) and a water-lean phase (i.e. a phase containing less than half of the water present in the condensate) the water-rich phase may be withdrawn from the system and the water-lean phase can be returned to the reactor. However, we prefer to remove the water from the condensed azeotrope by passing the condensed azeotrope through a hydrophilic absorbent which will absorb the water from the condensed azeotrope. The preferred means of removing water from the condensed azeotrope is especially applicable when our process is conducted at a pressure greater than atmospheric pressure and when the condensed azeotrope forms a single phase. A suitable hydrophilic absorbent through which the condensed azeotrope may be passed to absorb the water present therein is activated alumina.

The reaction of the instant process is preferably performed within the liquid organic compound that is used to form an azeotrope with water or with water and the alcohol reactant. That is, the liquid organic compound is preferably a compound within which the reactants of our process are soluble. By this means the reactants can be brought into intimate contact thereby promoting the desired reaction. Liquid organic compounds that have been found useful in our process both in forming the desired azeotrope and in dissolving the reactants are cyclic hydrocarbons, illustrative of which are toluene, cyclohexane and benzene. Both cyclohexane and benzene dissolve the alkoxysiloxane reactants of our process and ethanol and form azeotropes with water and ethanol. Toluene is useful in removing the water formed in our process when 2-methoxyethanol is used as a reactant but it was not found to be useful in removing water when ethanol was used as a reactant.

Liquid organic compounds that may be used in our process to form an azeotrope with water or with water and the alcohol reactant can be present in the reaction mixture in amounts of from about 0.05 part to about 5.0 parts by weight per part by weight of the reactants. We prefer to employ amounts of the liquid organic compound that may be used in our process to form an azeotrope with water or with water and the alcohol reactant of from about 0.25 part to about 2.0 parts by weight per part by weight of the reactants. Since the amount of the liquid organic compound that may be used in our process to form an azeotrope with water or with water and the alcohol reactant present in the reaction mixture was not found to be narrowly critical, other than the indicated amounts may be used but no commensurate advantage is gained thereby.

The temperature used in our process is not narrowly critical. Thus temperatures of from about 64° C. to about 235° C. are useful; but we prefer to use temperatures in the range of from about 100° C. to about 200° C. Temperatures outside of the indicated ranges may be used but no commensurate advantage is gained thereby. Above 235° C. undesirable decomposition and disproportionation reactions involving the alkylsiloxane reactant occur and the alcohol reactant begins to decompose.

In order to separate the water formed in our process by vaporizing an azeotrope, our process may be conducted at the boiling point of the reaction mixture. To insure that the reaction mixture boils within the wider temperature ranges given above, pressures greater than atmospheric pressure can be employed. Operating our process at a pressure greater than atmospheric pressure and at the boiling point of the azeotrope tends to reduce the reaction times significantly and also tends to produce greater yields of the desired alkoxysilicon products.

We use a catalyst in our process. Useful catalysts in our process are acidic compounds. Illustrative of the acidic compounds that are suitable for use in this invention as catalysts is sulfuric acid. Hydrochloric acid is also a catalyst in our process but it has not been found to be as effective as sulfuric acid.

The concentration of the catalyst used in our process is not narrowly critical. Thus catalyst concentrations of from about 0.5 part to about 10 parts by weight of catalyst per 100 parts by weight of the alkylsiloxane reactant are useful, but catalyst concentrations of from about 2 parts to about 6 parts by weight of catalyst per 100 parts by weight of the alkylsiloxane reactant are preferred. Other catalyst concentrations may be used but no additional advantage is gained thereby, and, on the other hand, if very large amounts of acid catalyst are used the hydroxyl groups of the alcohol reactant tend to dehydrate to form ethers. In addition to involving a loss of the alcohol reactants such dehydration reactions, which conform to the equation:

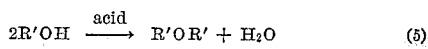

$$2R'OH \xrightarrow{\text{acid}} R'OR' + H_2O \quad (5)$$

where R' has the same significance as above, produce water.

At the completion of the reaction the desired alkoxysilicon products can be separated from the reaction mixture. To accomplish this the catalyst can be neutralized, the reaction mixture stripped of the liquid organic compound, if any, that was used to form an azeotrope with water or with water and the alcohol reactant, the residue filtered and the filtrate fractionally distilled to produce as a distillate the desired alkoxysilicon products.

The following examples are illustrative of our invention.

*Example I*

Seventy-four grams of octamethylcyclotetrasiloxane, 160 grams of 2-methoxyethanol, 1 gram of concentrated sulfuric acid and 60 ml. of toluene were placed in a 500 ml. flask that was equipped with a fractionating column and a moisture trap. The reactants were heated to 115° C.–125° C. to establish reflux conditions. The reaction was continued under these conditions for 24 hours with continuous removal of water from the refluxing azeotrope in the moisture trap. The azeotrope contained 2-methoxyethanol, water and toluene. The sulfuric acid was then neutralized by the addition of sodium bicarbonate and the product was stripped of solvent under reduced pressure. The product was then fractionated under reduced pressure to obtain the following fractions:

| Fraction | Boiling point (° C.) | Pressure (mm. Hg) | Fraction weight (grams) | Refractive index [$n_D^{25}$] |
|---|---|---|---|---|
| I | 15–41.5 | 1 | 5.4 | 1.4040 |
| II | 41.5–50 | 0.9 | 9.6 | 1.4099 |
| III | 50–51 | 0.8 | 29.8 | 1.4098 |
| IV | 40–58 | 0.35 | 6.2 | 1.4092 |
| V | 58–59 | 0.35 | 29.2 | 1.4078 |
| VI | 59–75 | 0.35 | 5.0 | |
| VII | 75–77 | 0.35 | 6.0 | |

Fraction III was dimethyldi(2-methoxyethoxy)silane which was recovered in 21.6 mole-% yield based on silicon charged. Fraction V was dimethyl(2-methoxyethoxy)siloxydimethyl(2-methoxyethoxy)silane which was recovered in 25 mole-% yield. Fractions III and V were analyzed and the following results were obtained.

| Fraction | Density at 25° C. | Percent by weight of combined silicon | | Molecular weight | |
|---|---|---|---|---|---|
| | | Found | Theoretical | Found [1] | Theoretical |
| III | 0.960 | 13.2 | 13.4 | 206 | 208 |
| V | 0.962 | 19.7 | 20.6 | 290 | 282 |

[1] Determined cryoscopically in cyclohexane.

*Example II*

Seventy-four grams of a dimethylpolysiloxane gum that had a molecular weight of about 400,000, 138 grams of absolute ethanol, 1.0 gram of concentrated sulfuric acid that had a specific gravity of 1.84 and 100 milliliters of benzene were placed in a 500 milliliter flask that was equipped with a fractionating column and a moisture trap. The reactants were heated to 72° C. to establish reflux conditions. The reaction was continued under these conditions for 54 hours with continuous removal of water from the refluxing azeotrope. The azeotrope comprised water, benzene and ethanol. The water so separated weighed 3.8 grams and corresponded to 21.5% of the amount of water that would have been produced had the reaction gone to completion. The reaction mixture was fractionally distilled and dimethylethoxysiloxydimethylethoxysilane and bis(dimethylethoxysiloxy)dimethylsilane were obtained.

We claim:

1. A process for producing alkoxysilicon compounds that are represented by the graphical formula,

$$X[RXSiO]_nSiX_2R$$

wherein $n$ is an integer from 0 to 2, X is a member selected from the group consisting of alkyl groups, the methoxy group, the alkoxymethoxy groups, the ethoxy group and the alkoxyethoxy groups, at least one X is a group other than an alkyl group and R is an alkyl group, which comprises forming a mixture of an alkylsiloxane, an acidic catalyst and an alcohol that is represented by the graphical formula,

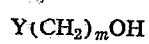

$$Y(CH_2)_mOH$$

wherein Y is a member selected from the group consisting of the hydrogen atom and alkoxy groups and $m$ is an integer from 1 to 2, heating the mixture to a temperature sufficiently elevated to cause the alkylsiloxane and the alcohol to react to produce said alkoxysilicon compounds and water and continuously removing the water formed in the reaction from the mixture.

2. A process for producing alkoxysilicon compounds that are represented by the graphical formula,

$$X[RXSiO]_nSiX_2R$$

wherein $n$ is an integer from 0 to 2, X is a member selected from the group consisting of alkyl groups, the methoxy group, the alkoxymethoxy groups, the ethoxy group and the alkoxyethoxy groups, at least one X is a group other than an alkyl group and R is an alkyl group, which comprises forming a mixture of an alkylsiloxane, an acidic catalyst and an alcohol that is represented by the graphical formula, $$Y(CH_2)_mOH$$

wherein Y is a member selected from the group consisting of the hydrogen atom and alkoxy groups and $m$ is an integer from 1 to 2, said alcohol being present in an amount of from about 0.5 to about 10.0 gram-moles of the alcohol per gram-atom of combined silicon in said alkylsiloxane, heating the mixture to a temperature sufficiently elevated to cause the alkylsiloxane and the alcohol to react to produce said alkoxysilicon compounds and water and continuously removing the water formed in the reaction from the mixture.

3. A process for producing alkoxysilicon compounds that are represented by the graphical formula, $$X[RXSiO]_nSiX_2R$$

wherein $n$ is an integer from 0 to 2, X is a member selected from the group consisting of alkyl groups, the methoxy group, the alkoxymethoxy groups, the ethoxy group and the alkoxyethoxy groups, at least one X is a group other than an alkyl group and R is an alkyl group, which comprises forming a mixture of an alkylsiloxane, an acidic catalyst, and an alcohol that is represented by the graphical formula, $$Y(CH_2)_mOH$$

wherein Y is a member selected from the group consisting of the hydrogen atom and alkoxy groups and $m$ is an integer from 1 to 2, said alcohol being present in an amount of from about 2 to about 5 gram-moles of the alcohol per gram-atom of combined silicon in said alkylsiloxane, heating the mixture to a temperature sufficiently elevated to cause the alkylsiloxane and the alcohol to react to produce said alkoxysilicon compounds and water and continuously removing the water formed in the reaction from the mixture.

4. A process for producing methoxysilicon compounds that are represented by the graphical formula, $$X[RXSiO]_nSiX_2R$$

wherein $n$ is an integer from 0 to 2, X is a member selected from the group consisting of alkyl groups and the methoxy group, at least one X is a group other than an alkyl group and R is an alkyl group, which comprises forming a mixture of an alkylsiloxane, an acidic catalyst and methanol, heating the mixture to a temperature sufficiently elevated to cause the alkylsiloxane and the methanol to react to produce said methoxysilicon compounds and water and continuously removing the water formed in the reaction from the mixture.

5. A process for producing ethoxysilicon compounds that are represented by the graphical formula, $$X[RXSiO]_nSiX_2R$$

wherein $n$ is an integer from 0 to 2, X is a member selected from the group consisting of alkyl groups and the ethoxy group, at least one X is a group other than an alkyl group and R is an alkyl group, which comprises forming a mixture of an alkylsiloxane, an acidic catalyst and ethanol, heating the mixture to a temperature sufficiently elevated to cause the alkylsiloxane and the ethanol to react to produce said ethoxysilicon compounds and water and continuously removing the water formed in the reaction from the mixture.

6. A process for producing alkoxysilicon compounds that are represented by the graphical formula, $$X[RXSiO]_nSiX_2R$$

wherein $n$ is an integer from 0 to 2, X is a member selected from the group consisting of alkyl groups, the methoxy group, the alkoxymethoxy groups, the ethoxy group, and the alkoxyethoxy groups, at least one X is a group other than an alkyl group and R is an alkyl group, which comprises forming a mixture of an alkylsiloxane, an acidic catalyst and an alcohol that is represented by the graphical formula, $$Y(CH_2)_mOH$$

wherein Y is a member selected from the group consisting of the hydrogen atom and alkoxy groups and $m$ is an integer from 1 to 2, heating the mixture to a temperature of from about 64° C. to about 235° C. to cause the alkylsiloxane and the alcohol to react to produce said alkoxysilicon compounds and water and continuously removing the water formed in the reaction from the mixture.

7. A process for producing alkoxysilicon compounds that are represented by the graphical formula, $$X[RXSiO]_nSiX_2R$$

wherein $n$ is an integer from 0 to 2, X is a member selected from the group consisting of alkyl groups, the methoxy group, the alkoxymethoxy groups, the ethoxy group and the alkoxyethoxy groups, at least one X is a group other than an alkyl group and R is an alkyl group which comprises forming a mixture of an alkylsiloxane, an acidic catalyst and an alcohol that is represented by the graphical formula, $$Y(CH_2)_mOH$$

wherein Y is a member selected from the group consisting of the hydrogen atom and alkoxy groups and $m$ is an integer from 1 to 2, heating the mixture to a temperature of from about 100° C. to about 200° C. to cause the alkylsiloxane and the alcohol to react to produce said alkoxysilicon compounds and water and continuously removing the water formed in the reaction from the mixture.

8. A process for producing alkoxysilicon compounds that are represented by the graphical formula, $$X[RXSiO]_nSiX_2R$$

wherein $n$ is an integer from 0 to 2, X is a member selected from the group consisting of alkyl groups, the methoxy group, the alkoxymethoxy groups, the ethoxy group, the alkoxyethoxy groups, at least one X is a group other than an alkyl group and R is an alkyl group, which comprises forming a mixture of an alkylsiloxane, said alkylsiloxane corresponding to the graphical formula, $$(R_3SiO_{0.5})_q(R_2SiO)_r(RSiO_{1.5})_s$$

wherein R is an alkyl group and wherein $q$, $r$ and $s$ are zero or integers and have a sum of at least 2, an acidic catalyst and an alcohol that is represented by the graphical formula, $$Y(CH_2)_mOH$$

wherein Y is a member selected from the group consisting of the hydrogen atom and alkoxy groups and $m$ is an integer from 1 to 2, heating the mixture to a temperature sufficiently elevated to cause the alkylsiloxane and the alcohol to react to produce said alkoxysilicon compounds and water and continuously removing the water formed in the reaction from the mixture.

9. A process for producing alkoxysilicon compounds that are represented by the graphical formula, $$X[RXSiO]_nSiX_2R$$

wherein $n$ is an integer from 0 to 2, X is a member selected from the group consisting of alkyl groups, the methoxy group, the alkoxymethoxy groups, the ethoxy group and the alkoxyethoxy groups, at least one X is a group other than an alkyl group and R is an alkyl group, which comprises forming a mixture of an alkylsiloxane, a liquid organic compound that forms an azeotrope with water, an acidic catalyst and an alcohol that is represented by the graphical formula, $$Y(CH_2)_mOH$$

wherein Y is a member selected from the group consisting of the hydrogen atom and alkoxy groups and $m$ is an integer from 1 to 2, heating the mixture to a temperature sufficiently elevated to cause the alkylsiloxane and the alcohol to react to produce said alkoxysilicon compounds and water and continuously removing the water formed in the reaction from the mixture by volatilizing an azeotrope comprising said water and said liquid oragnic compound.

10. A process for producing a silane selected from the group consisting of dimethyldi(2-methoxyethoxy)silane and dimethyl(2-methoxyethoxy)siloxydimethyl(2 - methoxyethoxy)silane, which comprises forming a mixture of octamethylcyclotetrasiloxane, 2-methoxyethanol, toluene and a catalytic amount of sulfuric acid, heating the mixture at about 115° C. to 125° C., producing said silane and water and continuously removing the water so produced from the mixture by volatilizing an azeotrope comprising water, 2-methoxyethanol and toluene.

11. A process for producing a silane selected from the group consisting of dimethylethoxysiloxydimethylethoxysilane and bis(dimethylethoxysiloxy)dimethylsilane, which comprises forming a mixture of a dimethylpolysiloxane gum, ethanol, benzene and a catalytic amount of sulfuric acid, heating the mixture at about 72° C., producing said silane and water and continuously removing the water so formed from the mixture by volatilizing an azeotrope comprising water, ethanol and benzene.

12. A process for producing alkoxysilicon compounds that are represented by the graphical formula, $$X[RXSiO]_nSiX_2R$$

wherein $n$ is an integer from 0 to 2, X is a member selected from the group consisting of alkyl groups, the methoxy group, the alkoxymethoxy groups, the ethoxy group and the alkoxyethoxy groups, at least one X is a group other than an alkyl group and R is an alkyl group, which comprises forming a mixture of an alkylsiloxane, an acidic catalyst and an alcohol that is represented by the graphical formula, $$Y(CH_2)_mOH$$

wherein Y is a member selected from the group consisting of the hydrogen atom and alkoxy groups and $m$ is an integer from 1 to 2, heating the mixture to a temperature sufficiently elevated to cause the alkylsiloxane and the alcohol to react to produce said alkoxysilicon compounds and water while maintaining the mixture at a pressure greater than atmospheric pressure and continuously removing the water formed in the reaction from the mixture.

References Cited in the file of this patent

UNITED STATES PATENTS

| 2,658,908 | Nitzsche et al. | Nov. 10, 1953 |
| 2,673,843 | Humphrey et al. | Mar. 30, 1954 |
| 2,746,982 | Hyde | May 22, 1956 |

OTHER REFERENCES

Daubach: "Z. Naturforschung," vol. 8B (1953), pp. 58–60 (48 Chem. Abstr. 9, 907h).

UNITED STATES PATENT OFFICE
Certificate of Correction

Patent No. 2,881,199                      April 7, 1959

Donald L. Bailey et al.

It is hereby certified that error appears in the printed specification of the above numbered patent requiring correction and that the said Letters Patent should read as corrected below.

Column 2, Formula (2) should read as shown below instead of as in the patent:

$$(R_3SiO_{0.5})_q(R_2SiO)_r(RSiO_{1.5})_s.$$

Signed and sealed this 18th day of August 1959.

[SEAL]

Attest:
KARL H. AXLINE,
*Attesting Officer.*

ROBERT C. WATSON,
*Commissioner of Patents.*